United States Patent
Prasad

(10) Patent No.: US 9,515,378 B2
(45) Date of Patent: Dec. 6, 2016

(54) ENVIRONMENT PROPERTY BASED ANTENNA RADIATION PATTERN OPTIMIZING SYSTEM

(75) Inventor: Muthukumar Prasad, Salem (IN)

(73) Assignee: PRASAD MUTHUKUMAR, Tamilnadu (IN)

( * ) Notice: Subject to any disclaimer, the term of this patent is extended or adjusted under 35 U.S.C. 154(b) by 452 days.

(21) Appl. No.: 13/884,977

(22) PCT Filed: Sep. 16, 2011

(86) PCT No.: PCT/IN2011/000641
§ 371 (c)(1),
(2), (4) Date: May 13, 2013

(87) PCT Pub. No.: WO2012/066559
PCT Pub. Date: May 24, 2012

(65) Prior Publication Data
US 2013/0237272 A1    Sep. 12, 2013

(30) Foreign Application Priority Data

Nov. 16, 2010    (IN) .......................... 3432/CHE/2010

(51) Int. Cl.
*H01Q 1/24*    (2006.01)
*H01Q 3/26*    (2006.01)
*H04B 7/06*    (2006.01)

(52) U.S. Cl.
CPC ............... *H01Q 3/26* (2013.01); *H01Q 1/245* (2013.01); *H04B 7/0617* (2013.01); *H04B 7/0695* (2013.01)

(58) Field of Classification Search
CPC   H04B 1/3838; H04B 7/0617; H04B 7/0695; H01Q 3/00; H01Q 3/01; H01Q 3/04–3/08; H01Q 1/245; H01Q 3/26
USPC ........ 455/63.1, 67.11, 67.13, 575.7; 342/372
See application file for complete search history.

(56) References Cited

U.S. PATENT DOCUMENTS

2009/0284438 A1*  11/2009  Matsunaga .......... H01Q 1/2291
                                                      343/876

* cited by examiner

*Primary Examiner* — Raymond Dean

(57) ABSTRACT

Mobile devices are handled in different environments which influence an antenna's performance due to electromagnetic interaction. Environment Property based Antenna Radiation Pattern Optimizing System (EPARPOS) is a system that actively varies, controls, directs, shapes and optimizes the antenna radiation pattern of mobile device in a closed loop manner controlled by precisely sensing the environment's property comprising dielectric nature, permittivity-$\in$, permeability-$\mu$, conductivity-$\sigma$, susceptibility, direction, dimension, range, orientation, position, location, utilizing visual sensing, infrared sensing and signal quality parameters are all to determine the effect of the environment and effect on environment in order to enhance signal quality, protect the users by controlling radiation exposure in a user facing direction while maintaining radiations in other directions to sustain communication and to save battery power by controlling radiation in less effective directions. The system is utilized for guiding the user to locate and position the mobile device in a living space to achieve optimized performance.

16 Claims, 6 Drawing Sheets

VARIOUS MODELS OF MOBILE DEVICE AND ITS HANDLING POSITION

MOBILE DEVICE     ORIENTATION

HEAD FORNT VIEW     HEAD TOP VIEW

BLOCK DIAGRAM:

Wireless Mobile Device

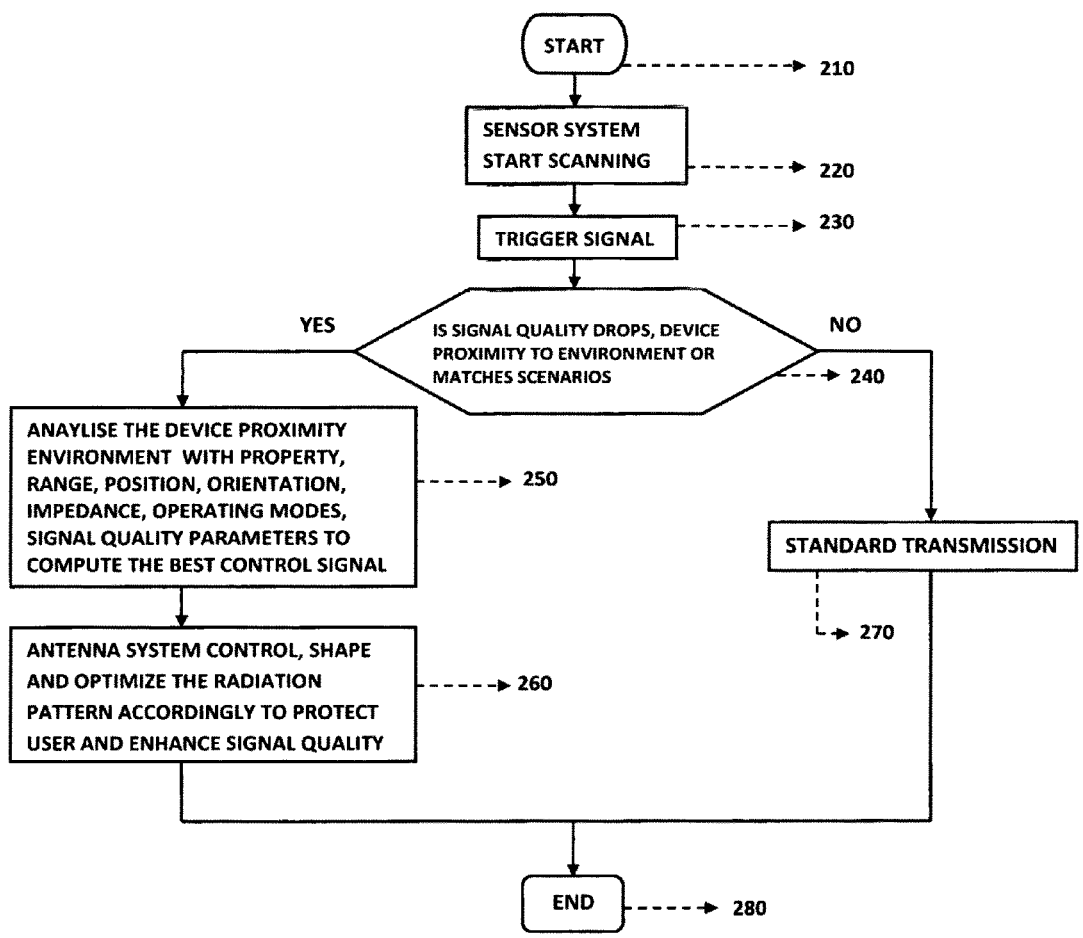

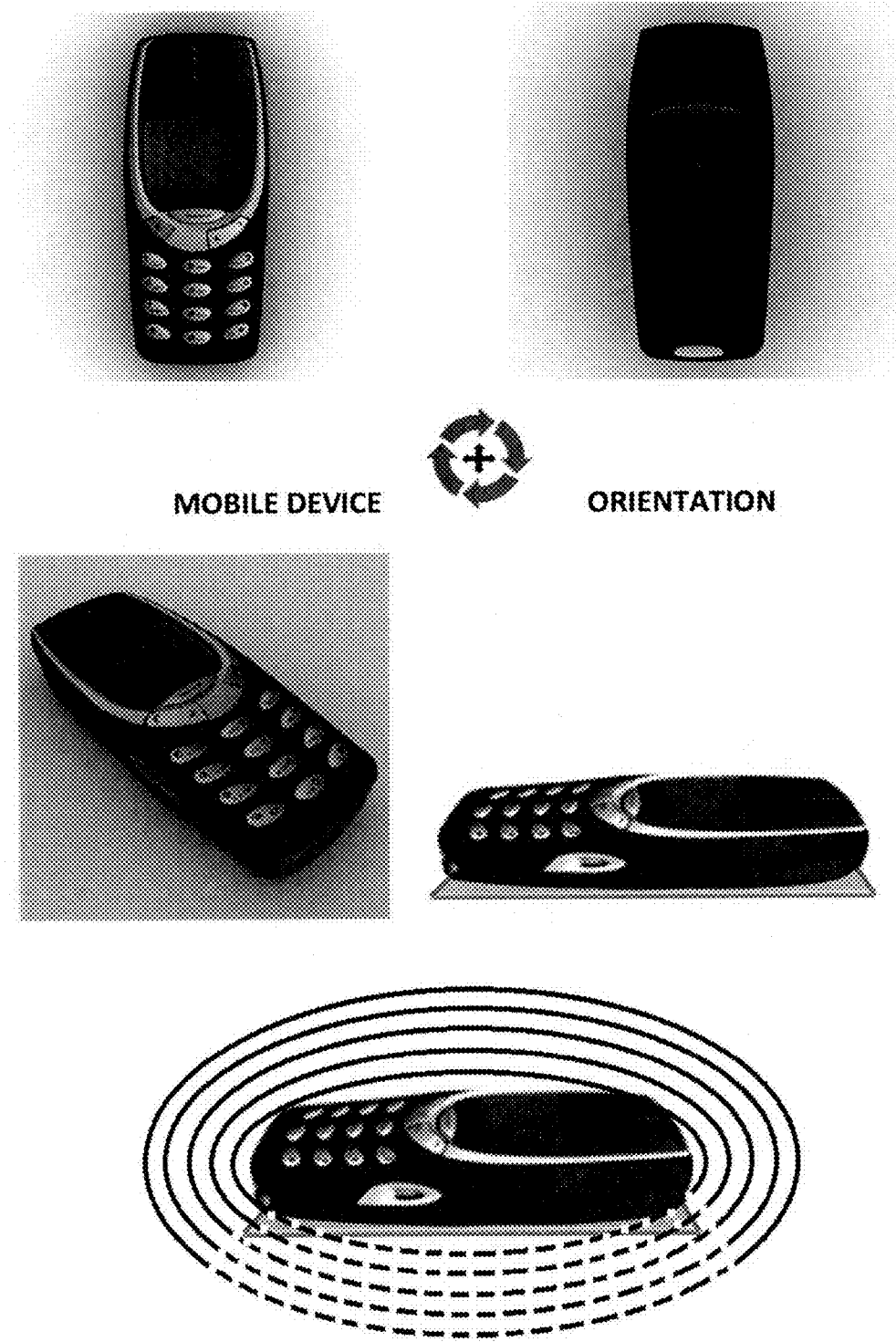

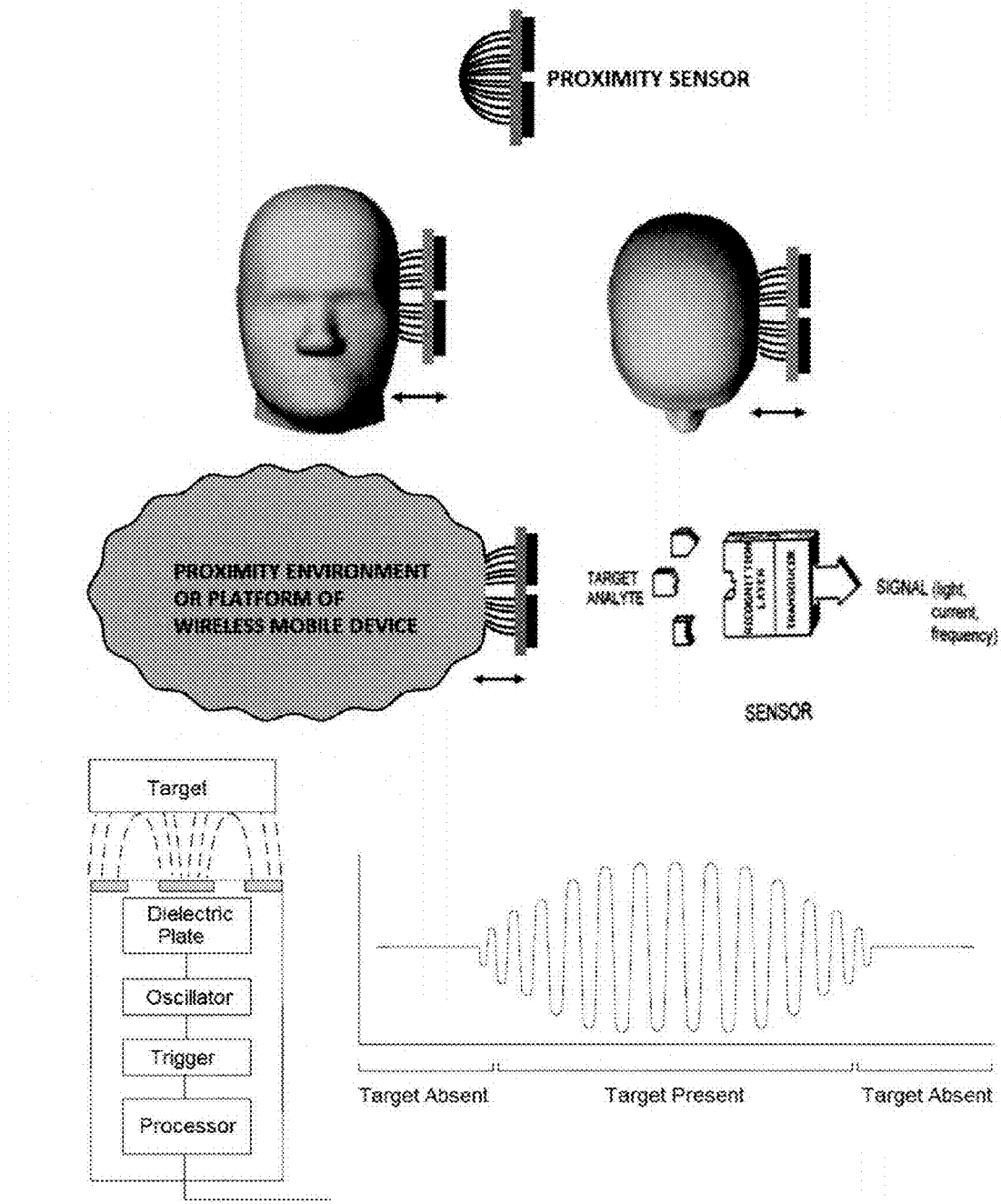

ENVIRONMENT PROPERTY BASED ANTENNA RADIATION PATTERN OPTIMIZING SYSTEM

FILED OF INVENTION

The Environment Property based Antenna Radiation Pattern Optimizing System (EPARPOS) is related to mobile communication and particularly to an active antenna radiation pattern controlling and shaping system for a wireless mobile device that works based on actively sensing the property or nature of a device environment, sensor system parameters, signal quality parameters, operating modes and usage scenarios to shape and optimize the radiation pattern ultimately for protecting the mobile user by reducing radiation exposure on user facing direction without compromising the quality of communication, enhancing Radio Frequency (RF) signal quality and to save battery power of the wireless mobile devices.

BACKGROUND OF THE INVENTION

To communicate with the network, mobile phones radiate electromagnetic waves when being used. The antennas in these wireless devices are used for receiving and radiating transmitted signal for communication. Signal quality parameters are not the only one to taken into account in designing an antenna system of the wireless mobile device but it is also important to make sure that the user RF exposure levels Specific Absorption Rate (SAR) are within compliance and standards. The wireless mobile devices are handled close against different environments and platforms, depends upon usage scenarios that causes electromagnetic interaction with environments based on its properties which in turn can leads to degradation of signal quality. Also device orientation change according to usage can leads to power loss due to polarization mismatch. In scenarios like when the signal quality is weak the fixed radiation pattern design without sensing the nature of environment and orientation can leads to radiations in directions that are less effective which in turn causes degradation in signal quality and loss of valuable battery power. In case of Multiple-Input Multiple-Output (MIMO) antenna arrays, the performance is very sensitive to the implementation of the antennas, the environment in which the devices is being used and even the orientation of the device itself. This means that a small change in the position of the device in use can result in significant change in data rate. For example, the user experience of a downloading speed or streaming video etcetera could go from excellent to marginal or poor just because the device was moved slightly during usage. Moreover, the presence of user hand and body cause radiation pattern distortion or detuning of the antennas and absorption of the radiation, thus affecting the efficiency and correlation performance of the antenna array. The constant mobility of the wireless mobile device when in usage further reinforces the need for sustainable performance.

It is not been proved that the generally handled positions of mobile phones to be absolutely safe and is not hazardous. The World Health Organization (WHO) has classified mobile phone radiation as possibly carcinogenic. The WHO has also concluded that the precautionary approach is an appropriate response to the lack of scientific consensus regarding the long term health effects of exposure to cell phone radiation. An IEEE journal on Microwave Theory and Techniques shows that the penetration level of radiation is more in children's as the width of skull is less and can also have effect on baby of pregnant women's. The Journal of the American Medical Association by researchers from the National Institute of Health and the Brookhaven National Lab identifies effect showing through their experiments that holding a cell phone to the ear increases the metabolic activity of nearby brain tissue. In addition to cancer issue lot of other possible health concerns the radiation can leads to are electromagnetic hypersensitivity, thermal or heating effect, non-thermal effect, genotoxic effect, fatigue, loss of memory, cognitive effect, sleep effect, ringing ears, effect on electro-medical devices like pacemaker and hearing aid etcetera. Several studies investigating the potential health effects of radiation on brain electrical activity, joint pain, heart rate, blood pressure, immune system are under the way. Research conducted regarding health concerns of radiation have increased, papers are published and researches are carried on regarding the long term effects of radiation and its medical complications. Generally these researches will take long time to produce results advanced clinical report and by that time the effect caused by the radiation can be substantial like for example smoking causes lung cancer, tobacco usage causes mouth cancer etcetera are confirmed after many years of study. The mobile phones have become an essential part of many lives not only for communication but also to handle safety and emergency situations. Regulatory Government bodies around the world have adopted international safety guidelines developed by scientific organizations governing the exposure to RF radiation and the mobile phones are designed to operate within these stringent limits. Specific Absorption Rate (SAR) is the measure of amount of radiation or electromagnetic energy absorbed by the body when exposed to radiating devices like mobile phone and has unit of watts per kilogram W/kg. It's difficult to build the antenna system with more filed strength for better communication and reduced SAR to protect the user from radiation. Most of the radiation shielding products like stickers covers etcetera available in the market works in standalone mode which is not smart enough or closed loop design to work efficiently according to various scenarios. Some can also hamper the radiated power that leads to negative impact by reducing the signal quality which in turn makes the antenna system to increase the transmitting power level to maintain communication thereby reducing the battery life.

Sensing the change in the wireless mobile device environment with its property plays an important role due to electromagnetic interaction with these environments. But currently the antenna system or radiation protection designs are not much concerned about detecting the change in nature or property of device environment and device orientation to control the radiation pattern which is essential in optimizing signal quality as well as protecting the user form radiation. There are some designs to reduce SAR and the main drawback with these designs that uses power regulator, power governing systems etcetera are it mainly focus on reducing the overall transmit power levels which in turn reduces the signal strength and the possibility of the signal to reach the base station that affects the quality of communication. Environment, orientation, location, position etcetera of the wireless mobile device are not a constant in real world scenarios and mostly the antenna system tested in lab are just designed to perform optimally in some scenarios which won't help to efficiently enhance the performance. It is hard for the antenna system just with existing signal quality parameters to act smartly according to scenarios without actively sensing the above mentioned parameters. As the wireless mobile device environment and orientation changes the fixed radiation pattern can also leads to power loss due to radiation in less effective directions.

Objective of the Invention

Objective of the invention is to achieve an optimized solution in enhancing RF signal quality, protecting the mobile user by reducing radiation exposure without compromising the quality of communication and to save battery power of the wireless mobile devices.

STATEMENT OF THE INVENTION

The radiation pattern optimizing system actively computes and optimize the radiation pattern based on nature of trigger signal from sensor system that particularly sense the change in nature or property of environment, its dimension, direction, range with respect to device, device orientation, location, position, visual and infrared sensing, usage scenarios and operating modes there by precisely sensing the effect of environment, direction of environment with respect to device, magnitude of impedance mismatch, radiation pattern distortion levels, property based user sensing, device antenna orientation sensing, power loss due to Polarization Loss Factor (PLF), sensing user body, head and hand hold effects, effect of the wireless mobile device platform in addition to existing signal quality parameters are all compared with predetermined and tested correlation table parameters in active, adoptive and closed loop manner for precisely computing diffraction limits, effect of and effect on environment thereby computing beam width, gain and directivity ultimately to optimize antenna radiation pattern to enhance signal quality by directing radiation on feasible and right direction, protecting the user by controlling the radiation exposure on user facing direction while maintaining radiations on other directions to sustain communication and to save battery power by controlling radiation in less effective directions. The radiation pattern is optimized through controlling gain and directivity, adaptive beam forming, shaping, switching, steering, spatial processing and filtering, adoptive the antenna system to match polarization, controlling transmit power levels, computing diffraction limits according to scenarios. The EPARPOS enhance the ambient intelligence of the wireless mobile device to more precisely sense and feel the human presence and other environments thereby to act according to scenarios. The sensor systems precision levels, sensing depth of dimension and multi-layer sensing are utilised depends upon the design, configurations, requirement and scenarios.

SUMMARY OF THE INVENTION

To address the issues with other designs and to enhance the signal quality with reduced SAR, the EPARPOS provides a smart active dynamic radiation pattern approach that works mainly based on sensing the change in device environments property, dimension, direction, distance, position and device orientation to actively shape and optimize the antenna radiation pattern, match polarization, control transmit power levels, controls gain and directivity, resonant frequency etcetera utilising active, smart and adaptive closed loop the antenna system with signal processing algorithm is presented. The main advantage of the EPARPOS is it predominantly utilises the already existing components of the wireless mobile device with little more sophistication and coding thereby making implementation easy and substantially reducing the implementation cost.

The EPARPOS works in conjunction with existing communication system standards, architecture, radio access techniques, signal quality parameters and specifications there by support the wireless mobile device to efficiently enhance its performance Example: mobile communication, Wi-Fi, Wi-Max, Bluetooth, ZigBee etcetera. It is practically difficult to make sure that the user handles the wireless mobile devices in an optimized position to achieve best performance as user might not be aware of or always technically sound to understand the issue behind it. So the EPARPOS provides a solution that can act smartly according to scenarios. The antennas are not smart by itself but it is the antenna systems that makes it to work smartly. In case of mobile the antenna system design, it is important to take SAR into account while designing signal quality enhancement system. So generally user head and hand hold effects, SAR etcetera are taken into account. But with property sensing the EPARPOS can more precisely sense the user and other environment in addition to usage scenarios with their effects on radiation pattern, its direction and position with respect to device antenna in real time usage scenarios to achieve an optimized solution in user protection and enhancing signal quality. Instead of reducing the overall radiated power with other designs to reduce SAR the EPARPOS primarily focus on multi-mode dynamic radiation pattern and multi-directional antenna amplification for actively shaping, controlling and reducing the intensity of radiation on direction facing the user or affecting environments and accordingly maintaining the radiation on other directions taking existing signal quality parameters into account to sustain quality of communication. In scenarios like when the signal quality is weak or drops below threshold the EPARPOS provides more flexibility than other designs by sensing and improving signal quality as well as protecting user by maintaining the radiations on user facing directions according to SAR compliance and standards while altering the intensity on other direction to sustain communication. The protection system not only controls the radiation on user facing direction to reduce SAR Example: During direct phone call conversation but also actively restores radiation according to parameters, scenarios and configuration to optimize communication Example: speaker mode, head set or hands free, download or data transfer mode etcetera. Also the EPARPOS helps to enhance DOA processing and computing beam forming vector. The sensor system scans frequently or based on configurations and usage scenarios. By shaping or focussing the radiation in right direction, power and time the EPARPOS can also saves battery power. The EPARPOS utilises either one or combination of following aspects to enhance the precision to optimize the radiation pattern.

According to one aspect the sensor system sense the change in nature or property permittivity-$\in$, permeability-$\mu$, conductivity-$\sigma$, susceptibility, dielectric, organic, inorganic of device environment or platform, sensing environments direction, dimension, range, multi-layers and position with respect to device, sensing user head, body and hand hold effect, device orientation and diffraction limits, effect on and of environment to accordingly shape and optimize the radiation pattern. The sensor system senses the change in property of environment, its position, direction, dimension, range, device orientation etcetera and triggers a processing unit. The processing unit compute the control signal based on trigger from sensor system, effect of environment on antenna or antenna degradation, magnitude of radiation pattern distortion, impedance mismatch and signal quality parameters directions are all compared with predetermined and tested correlation table parameters in active, adoptive and closed loop manner for precisely computing diffraction limits, beam width, effect of and effect on environment thereby to determine how the radiation pattern has to be shaped and optimized with corresponding transmit power levels. Based on the control signal the radiation pattern optimizer directs the RF or the antenna system to actively control and optimize the radiation pattern thereby to protect the user as well as to enhance signal quality.

According to another aspect, one or more sensors or cameras either visual or infrared thermo-graphic or combination of both and range sensors are optimally placed in the device or around the device according to design for sensing the environment, detecting human presence, face and body recognition, computing distance or range of user and environment, signal quality parameters are all compared with predetermined and tested correlation table parameters in active, adoptive and closed loop manner for precisely computing diffraction limits, beam width effect of and effect on environment thereby to shape the radiation pattern for protecting the user from radiation exposure as well as optimizing signal quality. As the property sensing sensor system has certain range limits and extending these range limits can leads to complications like increase in size, complexity, power consumption etcetera, beyond which the EPARPOS may utilise visual and infrared sensors for scanning and sensing the environment. The EPARPOS smartly toggles between sensors according to design, configurations and scenarios ultimately to obtain the environmental parameters and to optimize battery power. The cameras and range sensors are optimally located in the wireless mobile device to scan for the user and environment in Omni-direction, sensing multi-dimension, direction and distance of user and environment. The EPARPOS also utilise already existing front and rear cameras, side cameras and helps to protect the user from radiation in scenarios like video call, browsing, downloading, watching mobile, games etcetera.

According to another aspect, to further enhance the efficiency orientation sensors like gyro sensor, accelerometer, E-compass or magnetometer, inclinometer and similar sensors multi-axis sensors are utilised to actively sense the change in device antenna orientation and accordingly optimize the smart reconfigurable RF or the antenna system that can change and adopt to actively match polarization of communicating devices with the knowledge of relative antenna orientation to enhance the signal quality. The change in orientation of the wireless mobile device antenna is hard to reliably predict and the EPARPOS utilise polarization matching algorithm that helps to actively sense and mitigate the power loss due to polarization mismatch and thus controls the PLF. The orientation sensor actively senses the change in device orientation and triggers the processing unit. The processing unit computes the control signal based on trigger signal, relative antenna orientation of communicating devices, oblique instincts, threshold levels and other signal quality parameters to determine the nature of orientation or excitation phase to be adopted. Based on the control signal, the EPARPOS optimizes the reconfigurable the antenna system to match the polarization thereby to enhancing the signal quality. The antenna system is directed to actively match or optimize to either one common or reference polarization predetermined one else based on the actively shared information to optimize polarization between communicating devices accordingly.

According to another aspect, the trigger signal is based on usage scenarios or operating modes like direct and video call modes, speaker mode, hands free or headset modes, belt pouch and clip detection, key pad and touch screen detection, W-Fi and Bluetooth mode, sensing wireless modem and data transfer modes, game and browsing modes, cradle or holder detection, standby mode etcetera. The processing unit analyse the corresponding trigger signal from either one or combination of multiple components with signal quality parameters to determine the nature of the control signal to radiation pattern optimizer. The radiation pattern optimizer will direct the RF or the antenna system to optimize the radiation pattern accordingly.

According to another aspect, the EPARPOS depends upon the communication system design, scenarios and acting modes of the devices actively shares information and parameters between the communicating devices and utilise either one or more parameters like property of device environment, device orientations antenna orientation, location, position, altitude, existing signal quality parameters etcetera to shape and optimize the radiation pattern between them accordingly.

According to another aspect, the EPARPOS utilise correlation tables or field mapping tables or threshold level tables or lookup tables which are the comparison tables to actively check and compares the effects between predetermined and tested real world scenarios in the lab to the actual real world scenarios with which the EPARPOS actively optimize the antenna radiation pattern. Parameters like environments property sensing comprising permittivity-c, permeability-µ, conductivity-σ, susceptibility, dielectric, organic, inorganic, effect of environment on antennas, impedance, return loss or Standing Wave Ratio (SWR), radiation pattern distortion, range, near and far fields, various location and position, orientation, excitation phase, direction, various usage scenarios, operating modes, sensing user head, body and hand hold effect of user, diffraction limits, and signal quality parameters are all taken into account and utilised depends upon design and scenarios for the computing the predetermined and tested mapping tables. These tables helps to determine the change in environment with its property, direction, position, range, user sensing, relative antenna orientation of communicating device and effect caused by it more precisely so that the EPARPOS can shape or optimize the radiation pattern efficiently.

According to another aspect, the antenna system Example: antenna arrays or MIMO antenna itself act as sensors in sensing the change in environment with its nature based on change in antenna impedance, return loss or SWR and gain across various antenna like arrays, environments position and range with respect to device there by shaping and optimizing the radiation pattern according to predetermined and tested field mapping tables. The EPARPOS senses the effect of environment and its direction with respect to device antenna. The processing unit sense the antenna system parameters like change in input impedance magnitude of impedance mismatch, return loss or SWR, gain, signal quality, antenna detuning, channel capacity across various antennas, effect of user head body, head and hand hold effects and compute with the predetermined and tested table to shape and optimize the radiation pattern.

According to another aspect, the EPARPOS with application software utilises the sensor system parameters, signal quality parameters, channel capacity, usage scenarios and operating modes to guide the user to more precisely select the optimum location and position for using the wireless mobile device in user living space thereby to achieving best signal quality and to saving battery power. The processing unit actively compute to guide the user based on sensor system parameters, signal quality parameters and operating modes or usage scenarios to determine the optimum location.

BRIEF DESCRIPTION OF THE DIAGRAM

To get a comprehensive understanding of the EPARPOS, diagrams are described by examples.

FIG. 1 illustrates components of the EPARPOS—radiations from the wireless mobile device widely in all directions with base station and dotted lines representing the controlled reduced radiation on user facing direction FIG. 2 illustrates various the wireless mobile device handling position models. The front and top view of the wireless mobile device radiation incident on user head and the dotted lines representing the controlled radiation on direction facing the user head while maintaining the radiation on other directions FIG. 3 illustrates the block diagram of portable the wireless device with components of smart radiation pattern optimizing system according to the EPARPOS.

FIG. 4 illustrates the flowchart and describes the method of operation of the smart radiation pattern optimizing system.

FIG. 5 illustrates the wireless mobile device on various usage positions, environment or platforms and device orientations.

FIG. 6 illustrates property sensing sensor system sensing the user and environment with nature.

DETAILED DESCRIPTION

The main aim of smart radiation pattern optimizing system is to achieve an optimized solution in balancing between enhancing signal quality and simultaneously reducing SAR. When the signal quality degrades or reaches below the threshold level the EPARPOS monitors, computes and shape the radiation pattern accordingly in real time to achieve the best signal quality. As multiple parameters are taken into account for optimizing the radiation pattern, the EPARPOS to make sure that the optimizing is done by taking one or more parameters according to scenarios, communication system design and acting modes with ultimately prioritising and optimizing between to the protect user by reducing radiation exposure levels, achieving best signal quality and to save battery power. Also as the EPARPOS utilise multiple sensors and parameters the EPARPOS smartly coordinate between the various sensors according to scenarios and usage or operating modes to optimize the performance and to save battery power. In case if the parameters need to be obtained is out of scope of one sensor, the EPARPOS smartly and actively switch between multiple feasible sensors and other associated sensors to continue with tracking and obtaining of parameters for further processing. The sensor system smartly turns off the out of scope sensors accordingly to save the battery power. For example (i) As the property sensing sensor system has certain range limits and extending these range limits can leads to complications like increase in size, complexity, power consumption etcetera, beyond which the EPARPOS may utilise visual and infrared sensors for scanning and sensing the environment. The EPARPOS smartly toggles between sensors according to design, configurations and scenarios ultimately to obtain the environmental parameters and to optimize battery power (ii) when the user place the wireless mobile device upside on a platform the EPARPOS utilise front camera for sensing environment and if upside down automatically utilise rear side camera in addition to other associated sensors like property sensing sensors, orientation sensors, ambient light sensor etcetera to enhance the precision of the EPARPOS etcetera. The smart radiation pattern optimizing system also utilise artificial intelligence and neural network for sensing and learning the usage scenarios routine usage thereby to act accordingly. When multiple things are around the device, the EPARPOS checks for appropriate space and environment based on its property, device orientation, location, position, range, channel capacity and signal quality parameters for selecting the best feasible directions to actively shape and optimize the radiation pattern.

Figure 1:
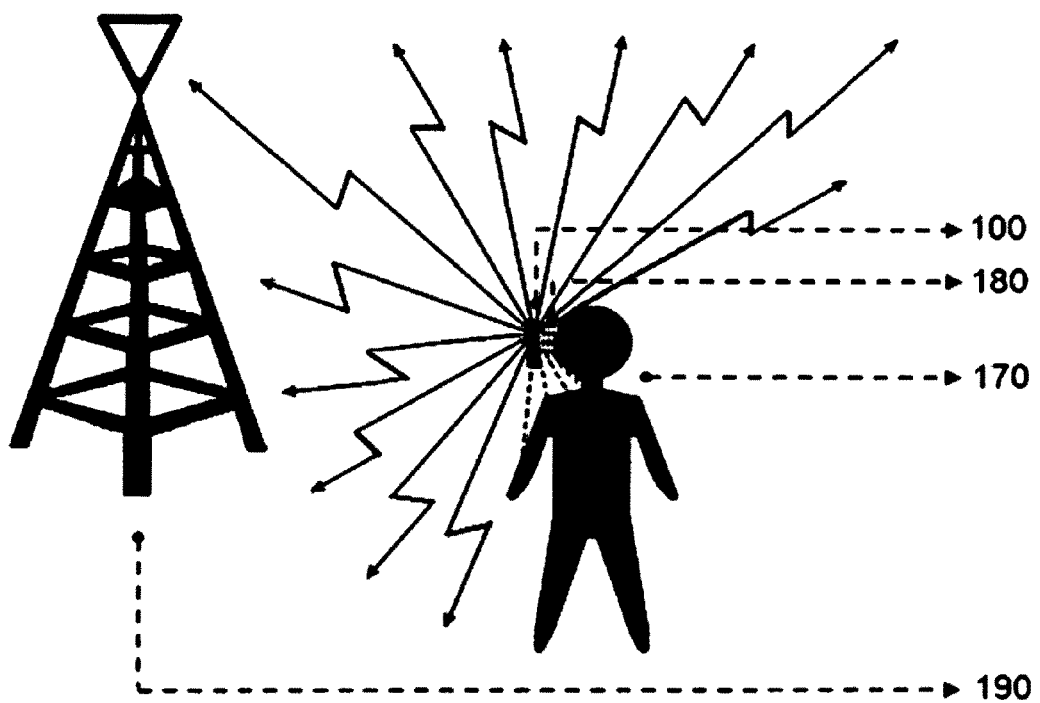

FIG. 1 illustrates the components of the wireless network according to the EPARPOS consisting of the wireless mobile device 100, User 170, Base station 190 and the radiation 180. To communicate with the network the wireless mobile device 100 radiates electromagnetic waves that are received by the base station 190 to connect with the backbone network. During this communication the antennas of the wireless mobile device 100 radiates power widely in all direction. This leads to portion of radiation 180 facing the user 170 to be absorbed by user body which leads to lot of medical complications. The EPARPOS precisely sense the human presence based on property, device orientation, signal quality parameters, operating modes and controls the intensity of radiation 180 dotted lines facing the user 170 to reduce SAR while accordingly maintaining the radiation on other directions to sustain quality of communication. The EPARPOS not only controls the radiation on user facing direction, but also restores radiation on user facing direction according to operating modes, usage scenarios and signal quality parameters to enhance communication.

Figure 2:
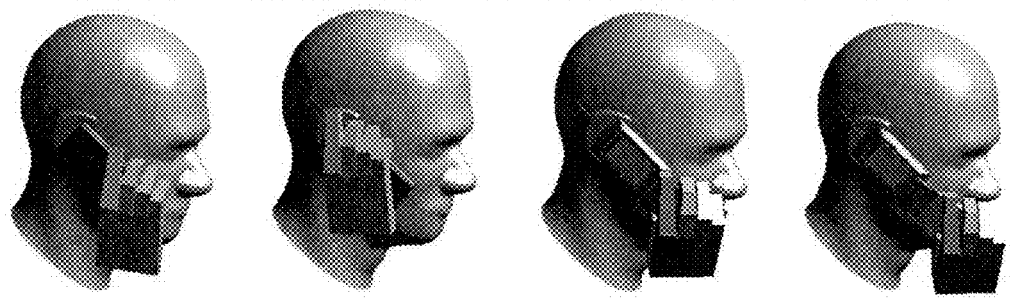
Figure 2:
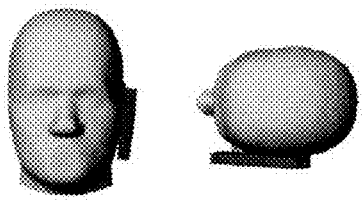
Figure 2:
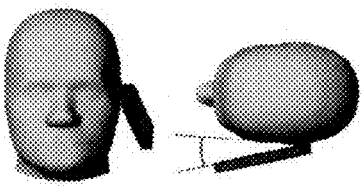
Figure 2:
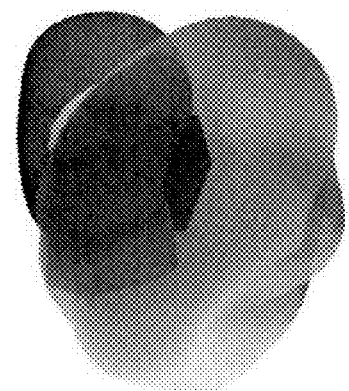
Figure 2:
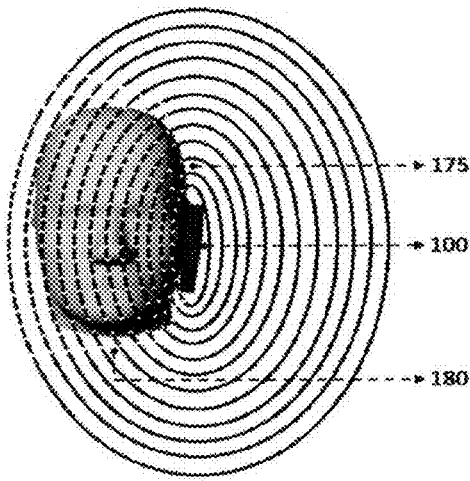
Figure 2:
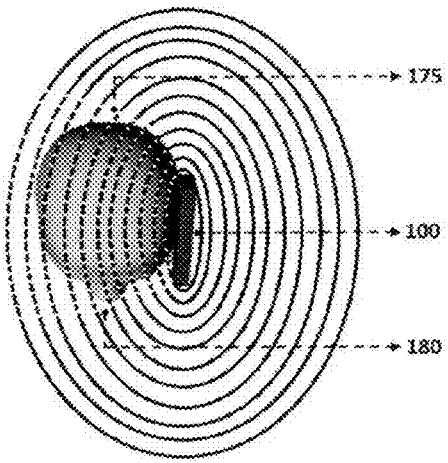

FIG. 2 illustrates various models of the wireless mobile device direct call conversation positions and usage. As the mobile handling position and device orientation changes according to usage scenarios the EPARPOS sense the change in property of environment, positions and device orientations there by to accordingly vary the radiation pattern align the controlling of radiation pattern to sustain quality of communication and reduce SAR. Also the last two figures illustrates the radiation incident on user head 175 from the wireless mobile device 100 with front and top view diagrams and the dotted lines representing the controlled and reduced radiation 180 on direction facing head while maintaining the radiations on other directions as per EPARPOS.

FIG. 5 illustrates the wireless mobile device on various positions, environments or platforms and different orientation that changes according to usage. The EPARPOS senses the device environment and orientation to optimize the radiation accordingly.

Figure 3:
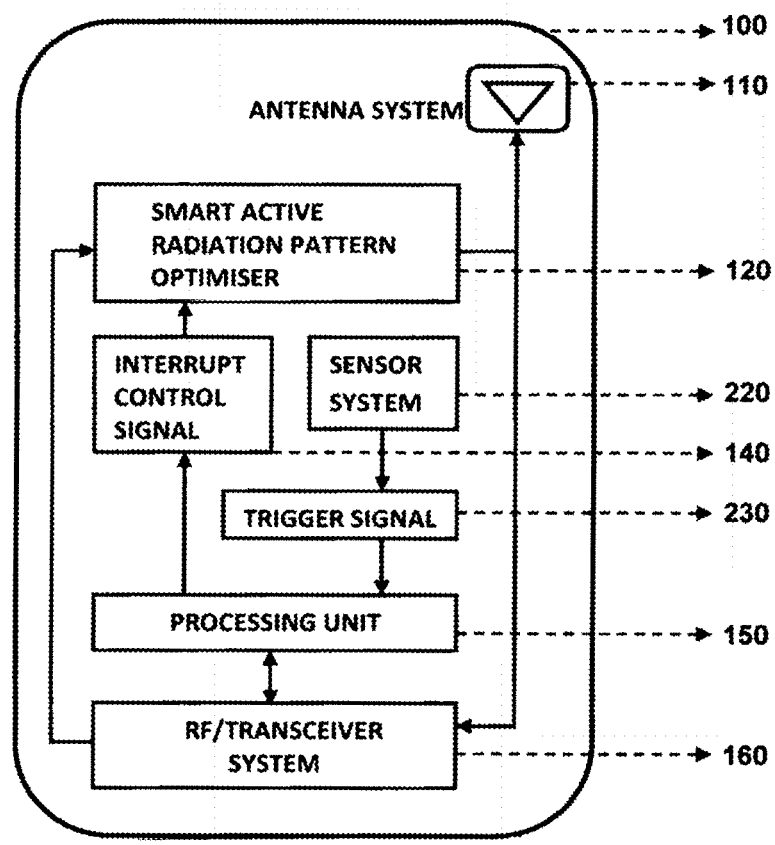

FIG. 3 is a block diagram describing the working principle of smart antenna radiation pattern optimizing system. Actually lot of components are there in the wireless mobile device 100 and the block diagram gives a brief description about various integral components according the EPARPOS like the antenna system 110, smart active radiation pattern optimizer 120, sensor system 220, trigger signal 230, interrupt control signal 140, processor 150, RF or transceiver system 160 etcetera. In general the wireless mobile devices consist of processor that controls the overall functions of the device. The processor handles lot of operations and the disclosed invention primarily focused on processor 150 interacting with sensor system 220, trigger signal 230, interrupt control signal 140, RF or transceiver system 160, smart radiation pattern optimizer 120 etcetera. The processing unit manipulate the control signal to actively optimize the radiation pattern based on trigger signal from sensor system 220, signal quality parameters like gain, RSSI or ASU, antenna sensitivity, SNIR, antenna impedance, TIS or TRP, PLF etcetera, sensing user head and hand hold effects, transmit power levels, channel capacity, operating mode or usage scenarios. Sensor system 220 is a combination of various sensors like property sensing sensors, orientation sensors, direction, location and position sensors, distance or range sensors, visual or infrared sensors, temperature sensor, humidity or moisture sensor etcetera and also the EPARPOS acquire information from other components to monitor the usage scenarios or operating modes of the wireless mobile device for generating trigger signal 230. As the EPARPOS works with critical mobile functions like signal quality enhancement, user protection and saving battery power a high priority interrupt can be assigned for manipulating the control signal 140 if a general mobile processor is used. In another aspect of EPARPOS a dedicated RF processing unit is used for the manipulation of control signal 140 to smart radiation pattern optimizer 120 or in yet another aspect, the radiation pattern optimizer 120 itself can be used for the manipulation of the control signal 140 by taking corresponding parameters into account.

According to one aspect the property sensing sensors, range and orientation sensors of sensor system 220 determines the change in property of wireless device 100 environment, its direction, range, device orientation etcetera and generates the corresponding trigger signal 230 to the processor 150. The processor 150 initiate interrupt service routine based on trigger signal from sensor system 220. The nature of trigger signal 230, transceiver 160 signal quality parameters, user radiation protection parameters are taken into account by the processor 150 to compute the interrupt control signal 140 to smart radiation pattern optimizer 120. Based on the interrupt control signal 140 the smart radiation pattern optimizer 120 actively shape and optimize the radiation pattern utilising corresponding RF or the antenna system 110 to protect the user 170 and enhance signal quality. One or more property sensing and range sensors or sensor arrays are optimally positioned around the device for precisely sensing the human presence and other environment in multi-direction, position and orientation with respect to the wireless mobile device. The processing unit compute the control signal based on sensing the change in property of device environment, sensing environments—direction, dimension, multilayer, range or distance and position with respect to device, simultaneously sensing multiple environments surrounding the device, user recognition head body and hand hold effect, computing diffraction limits, Mobile Sensing Platform (MSP), and ambient intelligence with predetermined and tested correlation table parameters. The radiation pattern gets significantly affected when the affecting environment is within certain range of the wireless mobile device due to electromagnetic interaction based on environments property. So the EPARPOS actively checks for any environment within the range or boundary that can significantly affect the antenna performance like antenna detuning, degradation, distortion, impedance, fading, absorption, reflection etcetera thereby sensing the environment's property, position, direction and range with respect to device, magnitude of antenna degradation, signal quality parameters etcetera to shape the radiation pattern accordingly. The multi-layer with property sensing helps the EPARPOS to more precisely senses beyond the user dress material cloths like device placed inside shirt pocket, pant pocket, sensing head, body, in hand, belt pouch, stand, over a platform etcetera to actively protect the user as well as optimizing signal quality in scenarios like on call or hands free or headset mode, prolonged download, streaming etcetera. The sensor system Example: property sensing or contact sensor utilised for scanning and sensing the property of environment Example: permittivity-E, permeability-µ, conductivity-σ, susceptibility, dielectric constants, capacitive sensing, capacitive displacement sensing, organic, inorganic etcetera. For example the sensor system like capacitive sensor works by generating the electric field and measuring the attenuations suffered by the field there by detecting the environment with its property. Since the measurement of attenuation or distortion suffered by the EM waves from antenna can differ from that of the field created by sensor system a predetermined and tested field mapping table or correlation table with threshold levels between sensor system and antenna radiation are utilised for sensing, comparing and matching the nature and effect caused by the environment for further computation in optimizing the radiation pattern. Even one or more sensors are utilised to precisely sense environment and user device based on its property with head, body and hand hold effects that are taken into account for generating the trigger signal. Also when the device is not in to the user in scenarios like speaker mode, data transfer or access internet modem, the EPARPOS dynamically changes its radiation pattern accordingly to improve the data transfer rates and quality of communication. The EPARPOS not only helps to enhance DOA processing but also helps to compute beam forming vector and optimize radiation pattern to enhance signal quality.

According to another aspect, the sensor system 220 utilise one or more sensors or cameras either visual or infrared thermo-graphic or combination of both and range sensors that are optimally located in the device according to design for sensing the environment, detecting human presence, face and body recognition, iris recognition, computing range or distance of user and environment, diffraction limits with predetermined and tested correlation table parameters to shape the radiation pattern accordingly for protecting the user from radiation exposure and to optimize signal quality. The cameras and range sensors scans for users and environment in 360 degree, multi or all possible direction, dimension and sensing the range or distance of user or environment with respect to device. The EPARPOS also coordinates with other sensors like property sensing sensors, orientation sensors etcetera and also utilise active Digital Signal Processing (DSP) and Digital Image Processing (DIP) techniques to enhance the precision of the EPARPOS Example: Signal processing techniques not only helps to recognise human presence but also helps to sense the magnification of face to detect the range etcetera. In scenarios like prolonged phone call, speaker mode, video call, browsing, games, downloading, streaming etcetera the user might hold the device in front and the EPARPOS checks for the user within the range where the radiation can significantly affect the user. Once the EPARPOS detects the user it looks for range of the user, as the range of the user presence is crucial for protecting the user as well as computing the magnitude of radiation pattern distortion etcetera to shape the radiation pattern accordingly. The EPARPOS accordingly shape and optimize the radiation pattern by also accounting presence of multiple user with their range, signal quality parameters and battery power consumption. The EPARPOS utilises Omni-directional cameras, 360 degree sensors or cameras visual and IR, popup cameras, front and rear cameras, side cameras and 3D cameras with the lenses utilised are ordinary camera lens, super or ultra-wide angle lens, fisheye lenses, extreme angle broadband metamaterial lenses, tuneable metamaterial lenses, super lenses etcetera.

The cameras, sensors, lens, aperture, wide-angle etcetera and other related parameters are all selected according to design, configuration, requirement and scenarios ultimately for scanning and detecting the environment in multi-direction and all possible direction. The ambient intelligence system utilising sensors and cameras that works on sensing human presence irrespective of whether the wireless mobile device is kept in light or zero light pitch-dark environment with thermal vision night vision that works in absolute darkness, fog, rain, smoke etcetera. The EPARPOS senses the user presence when the user brought himself within the range of sensors or cameras Example: video call, browsing, downloading, chatting, games etcetera. Already most of the current generation the wireless mobile devices have both front and rear cameras and the EPARPOS utilise these already existing cameras. The sensor system 220 senses the environment and generates the trigger signal 230 to the processing unit 150. The processing unit 150 computes the interrupt control signal 220 by sensing the user presence and other environment with its range and signal quality parameters. The radiation pattern optimizer 120 shape and optimize the radiation pattern accordingly with smart the antenna system 110. One or more distance or range sensors and cameras are selected from ultrasonic range sensor, infrared range sensor, acoustic range sensor, visual range sensor, photo electric range sensor etcetera and are utilised by the EPARPOS. The EPARPOS computes the direction, dimension and range of the user with computing diffraction limits to shape the radiation pattern accordingly to protect the user as well as to sustain signal quality. Also the EPARPOS turns off the out of scope cameras Example: based on nature of trigger signal from property sensing sensor, ambient light sensors etcetera to save battery power.

According to another aspect, to further enhance the efficiency of the EPARPOS in addition to other sensors the sensor system 220 utilises gyro sensor, accelerometer, E-compass or magnetometer etcetera and similar sensor to actively sense the change in orientation of the wireless mobile device 100 and accordingly reconfigure antenna to actively match the polarization between communicating devices to enhance the signal quality. The orientation of the wireless mobile device 100 changes depends on usage scenarios for example during data transfer or call conversation mode the user might use the device in different orientation angles and positions like while standing, sitting on a chair, laying on a bed etcetera, which leads to change orientation of device. So the EPARPOS controls the polarization according to change in antenna orientation of corresponding communicating device to efficiently match polarization. The EPARPOS works by sensing the change in device antenna orientation and actively controlling or reconfiguring antenna orientations, excitation phase, varying the dual polarization ratios etcetera with smart the antenna system to match the polarization of corresponding communicating devices thereby to actively sense, optimize and mitigate the power loss due to polarization mismatch. Another issue the Mean Effective Gain (MEG) is always treated as single, fixed number which is only valid for certain fixed orientations of antenna with respect to the direction of the multipath components in the propagation channel. This explains reason why moving the mobile phone on your head to a different angle can sometimes increase reception. The wireless mobile device antennas are often linearly polarized, so rotating the device can often match the polarization of the phone and thus increase reception. But in practical situations the orientation of the handset and thus its antenna cannot be reliably predicted. Moreover channel properties such as cross-polarization ratio and the angular spread are stochastic variables in nature. The sensor system sense and compute with device orientation, correlation table, oblique instincts, signal quality parameters, channel capacity and accordingly reconfigures the corresponding the antenna system Example: switching or reconfiguring antennas, control excitation phase etcetera to optimize radiation pattern with subsequent polarization in real time thereby matching polarization of communicating devices to control the PLF. Based on the trigger signal 230 from orientation sensors 220 and signal quality parameters from transceiver 160 the processing unit 150 compute the nature of control signal 140 to radiation pattern optimizer 120. The radiation pattern optimizer 120 controls the reconfigurable antennas systems orientation or excitation phase according to the control signal 140 thereby to match polarization and enhance the signal quality. The antenna system of the communicating devices works by either sensing the change in device antenna orientation or based on actively shared information between communicating devices regarding its own orientation else optimizing to one common or reference polarization predetermined one to match polarization between communicating devices. Orientation threshold levels are utilised to vary and reconfigure the antenna orientation or excitation phase and the levels are fine-tuned according to design and requirement.

According to another aspect, the sensor system 220 determines the change in operating mode or usage scenarios of the wireless mobile device by sensing either one or more parameters comprise of direct phone call mode, speaker mode, hands free, headset detection, video call mode, Bluetooth mode, belt pouch or clip sensor, key pad or touch screen detection, internet access or download mode, Wi-Fi mode, sensing wireless modem mode or data transfer mode, standby mode, cradle or holder sensor etcetera and generate the trigger signal 230. The processor 150 computes the control signal 140 to smart radiation pattern optimizer 120 based on signal from either one or combination of multiple sensors, usage scenarios and operating modes simultaneously accounting signal quality parameters from transceiver 160. Based on the interrupt control signal 140 the radiation pattern optimizer 120 controls the RF or the antenna systems 110 to vary radiation pattern accordingly to protect as well as to enhance signal quality. The EPARPOS protects the user from radiation in some scenarios where trigger signal can be based on just sensing one or more parameters for example in direct call mode mostly the user use the wireless mobile device to head which is taken as a parameter to control the radiations on user facing direction the EPARPOS also utilise sensor system parameters to further enhance the performance.

According to another aspect, the processing unit depends upon the communication system and corresponding acting modes of the devices, actively shares information or parameters between the communicating devices like property of environment, device antenna orientations, location, position, altitude, channel capacity, signal quality parameters etcetera and the devices the antenna system utilise either one or more parameters to shape and optimize the radiation pattern between them accordingly. The sensor system 220 generates trigger signal to the processing unit 150. The processing unit 150 computes the control signal 140 to smart radiation pattern optimizer 120 based on either one or combination of predetermined or actively shared parameters simultaneously accounting signal quality parameters from transceiver 160. According interrupt control signal 140 the radiation pattern optimizer 120 controls the RF or the antenna systems 110 to optimize the radiation pattern. The EPARPOS can either work in master or slave architecture or Peer to peer Example: Wi-Fi direct or ad-hoc or mesh network etcetera. For the wireless mobile device operating in real world scenarios it is difficult to predict the feasibility of Line of Sight (LOS) and non-LOS. There are scenarios where LOS between communicating devices is feasible in a living space, open ground etcetera and there are scenarios where LOS is affected by the environments like walls, objects etcetera. However, mostly the main directions of arrival do not change rapidly. Nowadays most of the wireless mobile devices are equipped with location and positioning systems Example: GPS, AGPS etcetera which helps the devices to know its own location. The EPARPOS verify the feasibility to enhance signal quality utilising actively shared parameters regarding location and position of the communicating devices to check for the direction with respect to each other, thereby actively shaping and optimizing the radiation pattern and transmit power levels between devices. For example in case of mobile communication the Base Station (BTS) or access points can be pre-provisioned to advertise or share the parameters like its exact location Example: GPS and antenna orientation information which are mostly fixed with the connecting the wireless mobile devices which already know its own location and antenna orientation with inbuilt GPS and orientation sensors that helps to shape and optimize the radiation pattern accordingly to enhance signal quality and to save battery power. As the BTS or access points antenna orientation is mostly fixed, all the wireless mobile devices tends to match the polarization of BTS or access point a master salve architecture can be utilised where BTS or access point act as master and all the wireless mobile device act as slave. These implementation can be performed with least cost and complication as this is a onetime configuration during installation of base station and performed based on location information form GPS, antenna orientation etcetera. In case of one to one communication Example: Wi-Fi direct, Bluetooth data transfer either one or both the device optimize the radiation pattern between each other and in case of multiple devices exist in communication systems Example: Wi-Fi infrastructure Access point or ad-hoc, mesh network the entire communicating devices actively shares the related information between each other and optimize radiation pattern with smart the antenna system Example: optimize radiation pattern according to access point.

According to another aspect, the EPARPOS utilise correlation tables or field mapping tables or threshold level tables or lookup tables which are comparison tables utilised to actively check and compare the effects between predetermined and tested real world scenarios in the lab to the actual real world scenarios with which the EPARPOS actively optimize the antenna radiation pattern. The design and the values in the tables are processed and developed based on parameters like properties permittivity-$\in$, permeability-$\mu$, conductivity-$\sigma$, susceptibility, dielectric, organic, inorganic of environment, sensing effect, direction and range of environment, input impedance, return loss or SWR, gain, orientation, oblique instincts, location and position, effect on near and far fields, RSSI or ASU, transmit power levels, diffraction limits and other signal quality parameters are all tested at various frequencies and scenarios and are taken into account and utilised depends upon design, configurations, usage scenarios and operating modes. These tables helps the EPARPOS to precisely determine the change in property of environment, direction and range, user sensing head, body and hand hold effects, dielectric values band of user body and other environments, conductive and dielectric nature, magnitude of radiation pattern distortion, environments location, position and direction, antenna orientation, magnitude of impedance mismatch with its effect caused more precisely; so that the EPARPOS can actively adapt by shaping and optimizing the radiation pattern efficiently according to scenarios. The sensor system 220 sense and generates trigger signal 230 to the processing unit 150. The processing unit 150 computes the control signal 140 to smart radiation pattern optimizer 120 based on the parameters collected and compared with field mapping tables or threshold level tables simultaneously accounting signal quality parameters from transceiver 160 to precisely sense the effects to optimize the radiation pattern accordingly. Based on the interrupt control signal 140 the radiation pattern optimizer 120 controls the RF or the antenna systems 110 to optimize the radiation pattern. The resolutions of the tables are fine-tuned according to design and requirement.

According to another aspect, the antenna system antenna arrays or MIMO antenna used for communication itself act as sensors in sensing the environment based on change in antenna impedance, gain, SWR or return loss etcetera across the arrays there by actively shaping and optimizing the radiation pattern according to compared results with predetermined and tested correlation table designed and developed taking parameters like impedance, gain, SWR, RSSI, channel capacity etcetera with various real world scenarios and frequencies. As the environment based on its property affects the antenna impedance, the nature and magnitude of change in impedance levels, gain, SWR are all utilised for sensing the effect of environment and its direction with respect to device antenna. Also as the channel capacity, signal strength and quality vary between multiple antennas Example: antenna arrays the EPARPOS actively sense and optimize the radiation pattern between multiple antennas accordingly multi-directional antenna amplification. The processing unit 150 senses the change in input impedance, gain, SWR, channel capacity, RSSI across antennas and compare with the predetermined and tested correlation table to compute the control signal 140 to smart radiation pattern controller 120. The radiation pattern controller 120 controls the antenna system 110 to actively optimize the radiation pattern. The EPARPOS works in an active, adoptive and closed loop manner from sensing, monitoring, comparing, computing and optimizing radiation pattern to achieve optimized performance.

According to another aspect, the EPARPOS with an application guides the user to select the feasible and optimum-location and position for using the wireless mobile device in the user living space there by helping in achieving best signal quality and saving battery power Example: during a long time call conversation, Bluetooth and Wi-Fi mode, internet access, prolonged downloading, games, wireless modem mode, multimedia streaming etcetera utilising sensor system 220 parameters, signal quality parameters, usage scenarios and operating modes of the device. The wireless mobile device maximise the transmitting power or radiate more power when the signal quality is weak in some locations to maintain communication which significantly reduces the battery power. The EPARPOS application actively helps in guiding the user with more precise and enhanced information to locate the wireless mobile device in optimum location and position to achieve maximum signal quality with enhanced the data rates and the user may either utilise of direct conversation, browsing or utilise wireless headset Bluetooth for conversation. The EPARPOS works by sensing the effect of device environments, device orientation, signal quality parameters, usage scenarios, operating modes and battery power. The EPARPOS also alerts the user regarding low signal quality and high Electro Magnetic Interference (EMI). The application sense the transmitted power level and alerts the user to locate the wireless mobile device in optimum location and position so that the user can utilise it for prolonged downloading, standby, utilise wireless hands free, headset or speaker mode for further conversation etcetera. The processing unit 150 actively compute the sensor system 220 parameters trigger signal 230, usage scenarios, operating modes and signal quality parameters to compute and guide the user regarding optimum location for using the wireless mobile device optimized location and position.

FIG. 4 is the flowchart describes the method of operation of the EPARPOS according to the invention. By starting with 210 the sensor system 220 determines the property of device environment, range, visual and IR sensing, device orientation, location, position, operating modes, usage scenarios of the device and will accordingly generate the trigger signal 230. The EPARPOS sense the state of trigger signal, degradation in signal quality and other matching parameters or scenarios to decide on further action 240. The EPARPOS analyse the nature of trigger signal, precisely sensing the effect of environment, direction and range of environment with respect to device, magnitude of impedance mismatch SWR and return loss with lookup table, radiation pattern distortion levels, user detection, location, position, device antenna orientation sensing, power loss due to PLF, sensing user body, head and hand hold effects, effect of the wireless mobile device platform, pre-shared information and parameters, usage scenarios and operating modes in addition to existing signal quality parameters like gain, Received Signal Strength Identifier (RSSI) or Active Set Update (ASU), antenna sensitivity, signal strength to signal quality ratio, location, position, Signal to Noise and Interference Ratio (SNIR), Total Isotropic Sensitivity (TIS), transmit power level, Total Radiated Power (TRP), transmit power level, channel capacity in an active, adoptive and closed loop manner to compute the best control signal for controlling the radiation pattern 250. Based on the control signal the antenna system shape and optimize the radiation pattern accordingly to achieve the best signal quality with reduced SAR 260. If the phone is not in to the environment that can affect the radiations or not matches other criteria the EPARPOS will follow the standard transmission 270 according to pre-set network configuration and ends with 280.

FIG. 6 Illustrates the model of property sensing sensor sensing the environment and user. Nature of the wireless mobile device environment changes depends upon usage scenarios which significantly influence the antenna performance due to electromagnetic interaction with the environment based on its nature or properties and have effects on radiation pattern distortion, input impedance, gain, efficiency, attenuation, fading, reflection, absorption or lossy environment etcetera. Since the property of environment changes over time to time depends upon device usage just detecting the change in environment without its property is not sufficient in controlling or shaping the radiation pattern as this approach could not determine the actual effect or radiation pattern distortion levels and shaping without property sensing can also leads to negative effects in signal quality. As sensing of environments nature or property is more important the property sensing sensor system utilised for the design not just detect the change in environment but with particularly sensing the property or nature of environment to actively optimize the radiation pattern accordingly. With most of the sensors already available in the wireless mobile devices but for different application, the EPARPOS can be implemented by making little more sophistication or enhancement to the sensor system already available in the wireless mobile devices present days. In general the EPARPOS sensor works by generating the field Example: electric field and measuring the attenuation suffered by the field there by detecting the property of environment comparing with predetermined and tested lookup table. As the environments are mostly dielectric, conductive or its combinations in nature the property sensing is mainly based on dielectric permittivity, conductivity and can be extended to sensing other like permeability, susceptibility etcetera depends upon system design. The EPARPOS precisely senses the nature of the environment and level of radiation pattern distortion to actively optimize the radiation pattern thereby to achieve signal quality, protect the user and saves battery power. As the property sensing sensors have certain limitations in extending the range of sensing the environment and even attempting to extend the range can leads to other design complications like sensor size, power consumption etcetera, the EPARPOS smartly shift or toggle between and utilise visual and infrared sensors with range sensors for sensing environment after certain range. Property sensing sensors, visual or thermal sensors, range sensors, orientation sensors etcetera are all smartly inter operate and synchronise with each other sensing the environment thereby to precisely optimize the radiation pattern.

As the sensitivity of the sensors differs from that of the antennas the EPARPOS utilise a predetermined and tested correlation table or field mapping table or threshold level or lookup table that are comparison tables for sensing and matching nature and effect caused by the environment for further computing designed and developed by testing the effect of different environments at various frequencies according to real world scenarios on radiation pattern or fields between antenna and sensor thereby to compare the effect and actively optimizing the radiation pattern accordingly. The performance evaluations are performed according to various antenna and device designs taking different device environment, operating modes, signal quality parameters, usage scenarios into account and are analysed, predetermined and tested to real world scenarios in the lab for computing the field mapping table there by to achieve signal quality, high data transfer rates and user protection. To further enhance the performance placing or positioning of one or more sensors sensor arrays on either one or double or multiple sides on the wireless mobile device is also optimized according to the antenna locations, device designs and related parameters so that the environment sensing and computing can work efficiently in sensing the environment. The resolution of the threshold or field mapping tables are fine-tuned depends upon the design and requirement. The EPARPOS works based on either sensing just the property or sensing the property and comparing with the tables to actively shape the radiation pattern. Combination of environment property, change in antenna input impedance, return loss or SWR, gain, radiation efficiency, near and far fields, loss monitors, frequency of operation, channel capacity, usage scenarios or operating modes etcetera are taken into account for manipulating predetermined and tested field mapping table which helps the EPARPOS to determine the direction of vicinity environment and effect caused by it more precisely so that the EPARPOS can shape or optimize the radiation pattern efficiently.

Detuning of the antenna is yet another consequence of user interaction. When the wireless mobile device its antenna is placed in to the lossy human tissue like user head, hand (hand hold effect), body and other vicinity environments shows degradation in antenna performance which is visible in input impedance, radiation pattern distortion, gain, efficiency, return loss etcetera, all as a function of frequency. The interaction between the user and the User Equipment (UE) exists in different forms based on UE types, usage scenario and the applications. For example, smart phones have versatile applications and thus several forms of user interactions exist. Regarding the antenna design for handsets, the requirements are mainly based on voice application, message and packet-oriented communications thus the required test scenario is performed with the user head and hand present so-called talk position and the testing requirements are extended to other usages like data transfer scenarios Example: file download, browsing, games mode etcetera. Various user environments are analysed predetermined and tested to real world scenarios like direct phone call conversation, head and hand hold effect etcetera for the manipulation of the threshold level table. The user body have a band of dielectric values permittivity depends upon skin, fat, muscle, bone, cerebrospinal fluid, brain tissue etcetera which are utilised for the processing and developing the lookup or field mapping tables. In case of other than call conversation or the wireless mobile device away from the user the device is often placed upside or upside down mostly on a homogeneous medium where the available sensor on front and rear sensor arrays located as per the design can sense the environment for further processing. The sensor system can also be utilised for sensing biological tissues in scenarios like direct phone call conversation or in internet access and download mode kept in a pocket where the EPARPOS can protect the user as well as optimizing communication. When the antenna system is utilised as a sensor Example: Impedance mismatch, SWR or Return loss etcetera and its related parameters, it can help in sensing vicinity environment to certain extent as it is intended for communication, but the dedicatedly designed sensor system can help to more precisely sense the environment. Suitable vicinity sensor active and passive are utilised by the sensor system, examples are as follows but not limited to electromagnetic or electrostatic sensors, acoustic, inductive, thermal, echo, capacitive, infrared, eddy current etcetera.

In case of Multiple-Input Multiple-Output antennas the performance of MIMO is very sensitive to the implementation of the antennas, the environment in which the devices is being used and even the orientation of the device itself. This means that a small change in the position of the device when in use can result in significant change in data rate. For example, the user experience of a streaming video could go from excellent to marginal or poor just because the device was moved slightly during use. Moreover, the presence of user hand and body cause radiation pattern distortion or detuning of the antennas and absorption of the radiation power, thus affecting the efficiency and correlation performance of the antenna array. The constant mobility of the wireless mobile device when in usage further reinforces the need for sustaining performance. LTE 4G or 4.5G the wireless mobile devices rely heavily on MIMO antenna technology to maximise data transfer rates that can be delivered to mobile subscribers. The actual data speeds experienced by the user are highly dependent on how well the wireless mobile device performs under the range of harsh mobile environments it encounters in the real world. So the dynamic radiation pattern shaping and optimizing based on sensing vicinity environment and device orientation with other signal quality parameters helps to optimize signal quality with data rates and also protecting user form radiation.

So the EPARPOS with MIMO or antenna arrays adaptive arrays and smart the antenna system can enhance the fine tuning and optimizing of radiation pattern through controlling gain and directivity, shaping, switch between multiple radiating elements, adaptive beam-forming, steering, polarization matching, spatial processing and filtering etcetera, based on sensing device vicinity environment, orientation, position, channel capacity with existing signal quality parameters to efficiently enhance the signal quality, protects user and to save battery power. In case of antenna arrays or MIMO the EPARPOS senses the change in device antenna orientation between corresponding devices and the antenna system is reconfigured, switch between multiple antennas or exiting phase is varied accordingly to match the polarization thereby to optimize the PLF. The EPARPOS utilising adaptive beam forming with MIMO antenna arrays by sensing device vicinity environment and position for transmitting and receiving signal in different directions eliminates the need for mechanically steering the arrays. Antenna arrays or MIMO the antenna system utilise multiple antennas may also be responsible for battery drain, which is especially problematic with continuous Internet access, download, streaming video, online games etcetera. In case of antenna arrays or MIMO as the number of antennas increase balancing the battery power becomes more important and the proposed system helps to improve the battery life by focusing the radiation in right direction, power and time. For example in a 2×2 MIMO the antenna system the radiation pattern can be varied by toggling between 2 antennas or varying the gain, directivity and transmit power levels of 2 antennas MIMO radiation pattern based on sensing device environment, orientation, position, operating modes etcetera. With tuneable metamaterial or EBG in combination with MIMO antennas or antenna arrays can further enhance in fine tuning the active dynamic radiation pattern. Multi-directional antenna amplification is performed based on sensor system parameters and usage scenario or operating modes thereby data transfer rates voice or packet are optimized between or across the antennas Example: antenna arrays controlled by the antenna system with signal quality parameters and channel capacity MIMO arrays strongest or maximum to least channel capacity. The sensor system can also use dynamic variable ground plane to actively vary the radiation pattern. The EPARPOS can be enhanced to adopt with antenna arrays more than 2×2 MIMO like 4×2, 4×4 etcetera and so on depends upon design.

In case of Wi-Fi, Bluetooth, Wi-Max, ZigBee etcetera and similar wireless communication systems where the wireless devices are handled in different vicinity environments, orientations, position etcetera according to usage which affects the performance of the antenna like radiation pattern distortion, antenna detuning, input impedance, polarization mismatch etcetera. The same sensor system sensing property of vicinity environment, orientation sensing system etcetera used for optimizing the radiation pattern on mobile communication can be enhanced accordingly to adapt to other possible communication systems. In case of laptops the Wi-Fi or Bluetooth antennas are generally located on the top of the display and sometimes the user might initiate download and close the lid or display. The opening and closing of the lid leads to change in vicinity and orientation of the antenna and so the EPARPOS works by sensing the vicinity with orientation and angle of the lid angle lookup table for sensing angles. The communicating devices Example: Wi- Fi, Wi-Max, Bluetooth etcetera actively shares the information depends upon communication system and acting modes of devices regarding parameters like device vicinity environment, device antenna orientation, location, position, altitude, signal quality to make sure that either one or more devices the antenna system optimize the radiation pattern shape, transmit power level and reconfigure antenna to match polarization etcetera accordingly. The EPARPOS also utilise similar type field of mapping table or threshold level comparison tables designed and developed according to these communication systems for comparing related parameters to enhance performance. The processing unit compute to optimize the radiation pattern either based on standalone device parameters or based on actively shared parameters between communicating devices or its combinations. In case of one to one communication Example: Wi-Fi direct, Bluetooth data transfer either one or both the device optimize the radiation pattern between each other and in case of multiple devices exist in communication systems Example: Wi-Fi infrastructure Access point or ad-hoc, Bluetooth mesh network the entire communicating devices actively shares the related information between each other and optimize radiation pattern with smart the antenna system accordingly.

The sharing of information is utilised with master or slave architecture like for example in a Wi-Fi network wireless access point acting as master and other connecting devices as slaves or clients where the client devices connecting the master actively optimize antenna radiation pattern according to actively information shared with master and in case of wireless ad-hoc one to one or mesh the communicating devices shape and optimize the radiation pattern between each other accordingly with shared information to achieve best signal quality. In case of multi-access wireless network optimizing the radiation pattern is performed between actively communicating devices. The antenna system of the communicating devices tries to match or optimize to either one common or reference polarization predetermined else based on the actively shared information between devices to optimize orientation of all devices. The EPARPOS has a provision for configuring the access points to broadcast its location information Example: GPS or AGPS, Wi-Fi positioning system etcetera with which the connecting devices can detect the direction and location of the access point based on which shaping and optimizing the radiation pattern is performed accordingly. As the resolution of GPS is more than that of the coverage of systems like Wi-Fi, Wi-Max etcetera and nowadays users are utilising GPS or AGPS etcetera constantly for some application like social websites in mobile to convey user current location information, are utilised in one to one communication between devices with sensing device direction to shape or optimize radiation pattern between them. As the Wi-Fi, Bluetooth etcetera utilising MIMO antenna arrays to increase throughput Wi-Fi-802.11n, Bluetooth consumes significant amount of power and the EPARPOS not only enhances signal quality and data throughput performance but also saves battery power during continuous data transfer like Internet access, Streaming, downloading, games etcetera. Following are the example where the EPARPOS can be utilised—In case of Wi-Fi the communication between devices like access points, laptops, tablets, the wireless mobile devices, smart TV, wireless printers etcetera acting modes might be Infrastructure or Ad-hoc mode, Wi-Fi access point, Wi-Fi direct, Wi-Fi tethering, Wi-Fi modems, wireless DLNA devices, streaming and Bluetooth devices like mobile phones, laptops, tablets, gaming devices, headset, printers etcetera acting as data transfers between devices, mobile acting as modem for internet access etcetera. Wi-Fi is a registered trademark of Wi-Fi alliance, Wi-Max is a registered trademark of Wi-Max Forum and Bluetooth is a registered trademark of Bluetooth SIG Inc, ZigBee is registered trademark of ZigBee alliance.

There are many ways to achieve and the following are some of the available RF or The antenna system designs for achieving dynamic radiation pattern, controlling gain and directivity, beamforming, beam steering, spatial processing and filtering, polarization matching etcetera. The dynamic radiation pattern can be achieved utilising tuneable meta-materials or tuneable EBG the antenna system 110 that provides variable response and ability to influence the interacting electromagnetic waves to determine whether the EM wave is transmitted, reflected, absorbed etcetera. In general tuneable-metamaterials and EBG are most commonly composed of small periodic elements typically built onto circuit boards or assembled using nanofabrication techniques, whose feature size is significantly smaller than the wavelength of the electromagnetic waves they are intended to manipulate. The lattice structure one, two or three dimension of the tuneable metamaterial and EBG is adjusted in real time, making it possible to reconfigure the structure during operation. The antenna design of smart signal quality enhancement system works by activating different patterns of tuneable EBG and metamaterial elements that act according to configuration to actively control radiation pattern and radiation intensity in required direction and time. Also the antenna design uses either one or combination of following but not limited to tuneable Metamaterials, tuneable Electromagnetic Band Gap (EBG), High Impedance Surface (HIS) or Artificial Magnetic Conductor (AMC), Negative Index Material (NIM), periodic arrays, Frequency Selective Surfaces (FSS), Split-ring Resonator (SRR), Reconfigurable antennas, antenna arrays, MIMO antennas, reconfigurable multi-frequency micro-strip patch antenna, antenna diversity, adaptive arrays, Micro Electro Mechanical System (MEMS) and the techniques user are Method of Moments (MOM), Computational electromagnetic (CEM) or Electromagnetic modelling, Finite Impulse Response (FIR), Finite-Difference Time-Domain (FDTD) etcetera with corresponding RF or the antenna system and signal processing algorithm to achieve dynamic radiation pattern, beamforming, beam steering, controlling excitation phase, spatial processing and filtering etcetera. The EPARPOS can be designed to adopt different multi-band antennas with several type of feeding mechanism. The EPARPOS can also be designed with actively tuneable electromagnetic screen Example: fabricated with tuneable metamaterial or EBG for dynamically controlling or redirecting the radiation from antenna in corresponding directions to vary radiation pattern is either fabricated on Printed Circuit Board (PCB) or incorporated on device casing. The plasma antennas achieve dynamic radiation pattern and the advantage of these plasma antennas over mechanical antenna are that the plasma antenna are reconfigurable, can operate at high speeds and has no moving parts. Smart ionized gas plasma antennas use plasma physics to shape and steer the antenna radiation pattern without the need of phased arrays etcetera. The radiation pattern can be steered or focused in the reflective or refractive modes using plasmas making it a unique one. Solid state plasma antennas also known as plasma silicon antennas with steerable directional functionality that can be manufactured using standard silicon chip fabrication techniques are now in development. The PSiAN is a cluster of thousands of diodes on a silicon chip that produces a tiny cloud of electrons when charged. Those tiny, dense clouds can reflect high-frequency waves like mirrors, focusing the beams tightly by selectively activating particular diodes. Achieving dynamic radiation pattern can be utilised with the EPARPOS to enhance the performance of mobile communication.

When there is a change in transmit power level of fixed radiation pattern, the change will take place with over all transmit power level according to radiation pattern. In general the wireless mobile devices like cell phones are designed to have fixed radiation pattern with major radiation pattern on the device rear side or other side facing the user and minor radiation pattern on device front side or user facing direction to reduce SAR also providing communication when major radiation pattern is blocked by usage or placed on platforms Example: conductive or dielectric that affects the interacting waves. So permanently reducing the intensity of radiation on user facing direction for protection can have negative effect on quality of communication based on usage scenario; for example when the device major radiation pattern side is placed on platforms that can degrade the interacting electromagnetic waves which in turn can degrades the quality of communication. Instead of fixed radiation pattern approach the EPARPOS provides an active dynamic radiation pattern solution that can change and adapt according to scenarios thereby provides the ability to actively shape and optimize radiation pattern in direction and time which helps in enhancing the communication and protecting user from radiation. The EPARPOS provides the fine tuning and controllable radiation on the user facing direction while maintaining the radiation on other direction that works according to different usage scenarios and signal quality parameters of the wireless mobile device 100 to achieve the balancing between best signal quality and least SAR so that the quality of communication is not compromised. Environment sensing like dimension, direction, nature, range etcetera with diffraction caused by the environments diffraction limits are also taken into account in shaping and optimizing radiation pattern to sustain Omnidirectional radiation beyond environment according to scenarios.

Already the wireless mobile devices use camera in front and rear and with little more sophistication these cameras can enhance it sense the human presence face and body recognition in day and night, vicinity objects, distance, its range or distance calculation. Thermo-graphic camera or infrared camera is a device that forms an image or video using infrared radiation, similar to a common camera that forms an image using visible light visible spectrum thus provides the EPARPOS with thermal vision. All objects emit a certain amount of black body radiation as a function of their temperatures. The amount of radiation emitted by objects varies according to temperature, scenarios and nature of objects. Higher an object's temperature is, the more infrared radiation emitted as black-body radiation. The variations in the temperature is utilised by thermo-graphic camera to compute the picture of humans, environments etcetera easily visible in a dark environment. It works even in total darkness because ambient light level does not matter. The human body have a range of infrared frequency and the EPARPOS is designed to actively sense these for further computing. These sophisticated sensors are utilised to enhance the precision of the EPARPOS in protect the users with most of the scenarios as well as optimizing signal quality. The EPARPOS helps the wireless mobile device to sense and feel the human presence and other environments can be further utilised for the mobile applications to work more precisely and lot of other potential applications like tracking, games, emergency situations, medical application etcetera. The sensor system can even be enhanced to precisely sense difference between the actual user and others and can act accordingly For security, privacy etcetera. Applications based on thermography have lot of potential applications and non-invasive medical applications like infrared imaging of body, thermometer etcetera. As the continuous sensing by sensor system can consume battery power the sensors with least to most power consuming sensors of sensor system are smartly utilised according to scenarios, usage and operating modes to save the battery power.

Over all combinations of sensing property of environment its radiation pattern distortion levels, position, orientation, change in input impedance, return loss or SWR, usage scenario or operating modes and signal quality parameters to optimize the radiation pattern in order to achieve signal quality enhancement, protect the user from radiation exposure and saves battery power. The nature of varying and controlling the radiation pattern with intensity of radiation facing the user is based on combination of parameters while limiting the maximum transmit power level as per the compliance with SAR safety guidelines. The instructions regarding how the radiation pattern is altered are predetermined and tested. The design can works in conjunction with change in overall radiated power by taking signal quality parameters into account to maintain the quality of communication while limiting maximum transmit power levels according to compliance and standards. Thus the design reduces the SAR with optimized communication quality. The EPARPOS not only enhances signal quality but also saves energy by actively controlling the gain and directivity there by reducing the radiation on certain less effective direction. Mostly as the radiation pattern for transmission and reception is reciprocal these system can help in improving the overall signal quality. The design not only helps in reducing the SAR, but also can reduce the interference with other systems like pacemaker, hearing aid etcetera. The EPARPOS can both be automatically and manually enabled and disabled with a hard or soft or combination switch depending upon the design and usage.

The embodiments of the EPARPOS invention is not limited to listed scenarios described here or its combinations and the above presented are just examples. There may be other scenarios and those who skilled in field can understand and modify, enhance, alter the herein system without departing from the scope of the invention in its widest form.

The invention claimed is:

1. An Environment Property based Antenna Radiation Pattern Optimizing System (EPARPOS) for a wireless mobile device comprising:
   a) a sensor system to generate a trigger signal by particularly sensing the nature or property comprising:
      permittivity-$\in$;
      permeability-$\mu$;
      conductivity-$\sigma$;
      susceptibility;
      dielectric;
      biological tissues;
      capacitive sensing;
      capacitive displacement sensing;
      inductive sensing;
      organic and inorganic nature of the wireless mobile device platform and environment;
      precisely sensing environmental the users and objects with its property;
      dimension;

direction;
multi-layers;
range or distance and position with respect to device;
visual and infrared sensing;
sensing mobile antenna's orientation, direction, location and altitude;
Mobile Sensing Platform (MSP);
ambient intelligence;
the wireless mobile device operating modes and usage scenarios;

b) a memory of the wireless mobile device that stores a comparison table utilized by a processing unit to actively check and compare the effects between a predetermined and tested real world scenarios in the lab to the actual real world scenarios with which a antenna system shapes and optimizes the antenna radiation pattern accordingly in an adaptive closed loop manner and also for precisely sensing the user, environments and the wireless mobile device usage scenarios c) a processing unit that computes a control signal based on
trigger signal from the sensor system;
precisely sensing the effect of environment on antenna radiation based on environmental property;
effect of environment on near and far fields;
magnitude of radiation pattern distortion and
property based user sensing to precisely sense head, body and hand hold effects
are all compared with the predetermined and tested correlation table parameters in an active, adoptive and closed loop manner for precisely computing diffraction limits θ, effect of the environment and effect on environment thereby computing beam width, gain and directivity to optimize an antenna radiation pattern;

d) an antenna system with dynamic radiation pattern, that operates based on the control signal from the processing unit that is coupled with a radiation pattern optimizer that actively directs, shapes and optimizes the radiation pattern
to enhancing the signal quality by directing the radiation in the appropriate direction;
to protect the user by controlling the radiation exposure on the user facing direction according to Specific Absorption Rate (SAR) compliance or standards and antenna radiation pattern distorting environments while maintaining the radiation on other directions to sustain communication;
to save battery power by controlling radiation in less effective directions;
to reconfigure the antenna system with the knowledge of relative antenna orientations to actively match the polarisation to increase the gain and to control Polarisation Loss Factor (PLF).

2. The wireless mobile device of claim 1, comprising a sensor system that operates based on one or a combination of sensors, operating modes and usage scenarios of the wireless mobile device comprising:

a) the sensor system with one or more optical sensors or cameras with visual, infrared or thermo-graphic, ultrasonic and its combinations are optimally located in the wireless mobile device according to the device design for scanning and sensing:
the environment and its objects in multi direction and dimension;
user presence;
face, body and iris recognition with autofocus;
computing distance or range of user and other environmental objects with respect to device; the infrared cameras utilized comprise active infrared sensors, passive infrared sensors and a combination of active and passive infrared sensors;

b) the sensor system with one or more
360 degree or omnidirectional sensors, visual and Infrared (IR) cameras;
fisheye lens cameras;
popup cameras;
existing front and rear cameras, side and corner cameras;
2D and 3D sensor cameras
with the lenses utilized comprising:
regular camera lens;
super ultra wide angle lens;
extreme angle broadband metamaterial lenses;
tuneable metamaterial lenses;
super lenses;
opto-fluidics lenses and
tuneable lenses
for scanning and detecting the environment in all possible direction;

c) the sensor system with one or more fisheye lens for sensing the change in the wireless mobile device environment and utilize other appropriate feasible lens cameras for further tracking of the users and objects in the environment;

d) the sensor system with one or more property sensing sensor comprising:
dielectric sensors;
electromagnetic sensors;
electrostatic sensors;
acoustic sensors;
inductive and capacitive sensors;
temperature sensors;
echo sensors;
thermo-graphic or infrared sensors;
eddy current sensors;
ambient light sensors;
ultrasonic sensors;
belt pouch sensor, clip sensor, cradle or holster sensor;
active and passive sensors;

e) the sensor system with one or more property sensing sensors that senses parameters comprising:
permittivity-∈;
permeability-μ;
conductivity-σ;
susceptibility;
dielectric;
biological tissues;
inductive and capacitive sensing;
capacitive displacement sensing;
inductive sensing;
organic and inorganic property
of device platform and environment;

f) the sensor system with one or more sensors for sensing change in the wireless mobile devices orientation, acceleration, altitude and direction comprising:
gyro sensor;
accelerometer;
inclinometer;
orientation sensors;
altitude sensors and
E-Compass or magnetometer;

g) the sensor system with one or more distance or range sensors and cameras are selected from the ultrasonic range sensors;
infrared range sensors;
electromagnetic range sensors;
acoustic range sensors;
visual range sensors and
photo electric range sensors
that are optimally located that senses the range of user and environment with respect to the wireless mobile device in all possible directions;
h) the sensor system with one or more Microphone (MIC) and ambient light sensors that senses the change in sound and ambient light level on the environment of the wireless mobile device;
i) the sensor system with one or more temperature, moisture and humidity sensors that senses the environment of the wireless mobile device;
j) the sensor system senses based on the wireless mobile device operating modes and usage scenarios comprising;
direct phone call mode;
speaker mode;
hands free mode;
headset detection;
video call mode;
Bluetooth mode;
detecting key pad and touch screen usage;
display orientation;
Wi-Fi mode;
Internet access and browsing;
download mode;
games;
streaming;
standby mode;
sensing data transfer and wireless modem mode;
k) the sensor system with one or more position and location sensing systems that senses the location and position of the wireless mobile device comprising
Global Positioning System (GPS);
Assisted Global Positioning System (AGPS);
Global Navigation Satellite System (GLONASS);
satellite based positioning system;
Wi-Fi positioning system;
cell sight positioning system;
Bluetooth positioning and
Hybrid positioning system.

3. The wireless mobile device of claim 1, comprising the processing unit, that computes the control signal, comprising functions comprising:
a) the processing unit that computes the interrupt control signal for actively shaping and optimizing the radiation pattern and polarization;
b) the processing unit operates with critical functions of the wireless mobile devices comprising:
signal quality enhancement;
protecting a user from radiation and
saving battery life;
c) the processing unit controls the sensor system by smartly toggling or turning off out of scope or switching between multiple feasible sensors and other associated sensors to obtain and continuously track the environmental parameters for further processing;
d) the processing unit utiliseutilizes Digital Signal Processing (DSP) and Digital Image Processing (DIP) to compute the information from the sensors; the information from the sensors is utilized by the processing unit to aid the user recognition, face recognition, iris recognition and the environmental objects with dimension and range.

4. The wireless mobile device of claim 1, comprising a smart RF antenna system that actively optimizes radiation patterns through
radiation pattern shaping;
controlling gain and directivity;
adaptive beam-forming and beam-steering;
antenna diversity;
spatial processing and filtering;
spatial diversity;
diversity gain;
pattern diversity;
polarization diversity;
multidirectional antenna amplification;
controlling transmit power levels and
with the antenna system that actively senses the change in relative device antenna orientation between communicating devices to reconfigure the antenna and controlling excitation phase to match and optimize polarization for controlling the PLF.

5. The wireless mobile device of claim 1, comprising a transceiver circuit or RE system that transmit and receive signals are selected from
a) circuitry consisting of a combination of both transmitter and receiver;
b) circuitry consisting of a separate transmitter and receiver.

6. The predetermined and tested correlation table of claim 1, comprising a field mapping tables, a threshold level tables, a lookup tables that are the comparison tables which are utilized by the processing unit to actively check and compare the effects between predetermined and tested real world scenarios in the lab to the actual real world scenarios with which the antenna system shapes and optimizes the antenna radiation pattern accordingly in an adaptive closed loop manner and also for precisely sensing the user, environments and the wireless mobile device usage scenarios:
a) the values in the tables are designed and developed using parameters comprising:
property of the wireless mobile device environment comprising:
permittivity-$\in$;
permeability-$\mu$;
conductivity-$\sigma$;
susceptibility;
dielectric;
organic;
inorganic;
user body band of dielectric values for sensing user;
capacitive sensing;
capacitive displacement sensing;
inductive sensing;
effect and range of the wireless mobile device environmental objects;
sensing multilayer of the wireless mobile device environment;
sensing biological tissue;
sensing various locations and positions;
sensing user, head, body and handhold effects;
impedance;
gain;
return loss or SWR;
Received Signal Strength Identifier (RSSI) or Active Set Update (ASU);
channel capacity;

near field and far field effects;
various signal quality parameters;
transmit power levels;
Signal to Noise and Interference Ratio (SNIR);
Total Isotropic Sensitivity (TIS);
Total Radiated Power (TRP);
device antenna orientations;
PLF;
antenna oblique instincts;
visual and thermo-graphic sensing;
effect of the wireless mobile device platform;
user body band of dielectric values;
user body band of infrared frequencies or wavelengths;
diffraction and diffraction limits;
effect of and effect on the wireless mobile device environments;
the wireless mobile device operating modes and the wireless mobile device usage scenarios
are all tested at various real world scenario and frequencies are utilized by processing unit according to scenarios and communication system design;
b) the above parameters and its values in the tables are utilized by the processing unit to determine the change in the wireless mobile device environment with its property and direction;
user sensing with band of user body dielectric values and IR frequencies;
conductive and dielectric nature;
magnitude of radiation pattern distortion;
location and position;
antenna orientation and its effects caused more precisely thereby to shape and optimize the radiation pattern;
c) the processing unit utilize analysed, predetermined and tested threshold levels table designed and developed with different orientations of the devices antenna to dynamically synchronise with change in device antenna orientation to match the polarisation between or with respect to corresponding communicating devices thereby mitigating the power loss due to polarization mismatch and control Polarization Loss Factor (PLF); orientation threshold levels and corresponding antenna oblique instincts are utilized in designing the table which in turn is utilized to vary and reconfigure the antenna orientation and excitation phase.

7. The processing unit of claim 1 share real time parameters regarding the mobile device environment, signal quality, operating modes and usage scenarios of the wireless mobile devices with the other communicating wireless mobile devices and utilize either one or more actively shared parameters between the communicating devices comprising of property of the wireless mobile device environment, device antenna orientations, position and location, altitude, in addition to existing signal quality parameters; thereby to direct, shape and optimize the radiation pattern between devices:
a) the processing unit utilize shared information regarding the property of the wireless mobile device environment, the wireless mobile device usage scenarios, the wireless mobile device operating modes, existing signal quality parameters, range, location and position, of the communicating devices between to check for the direction and distance with respect to devices thereby to actively direct, shape and optimize the radiation pattern between devices;
b) the actively shared antenna orientation information is utilized to match polarisation between communicating devices thereby to control power loss due to PLF;
c) the processing unit utilize location and positioning system to determine the direction of the communicating devices with respect to each other based actively shared information thereby shaping and optimizing radiation pattern accordingly;
d) the processing unit utilize master or slave architecture according to the communication system and corresponding acting modes of the devices for sharing information where all the clients or slaves checks with master's information or parameters and adopt accordingly;
e) the processing unit in case of ad-hoc, one to one and mesh network where the devices optimize the radiation pattern between communicating devices and adapt to common or reference polarisation according to the actively shared information.

8. The processing unit of claim 1, computes the control signal to achieve optimized radiation pattern based on sensor system parameters;
signal quality parameters;
predetermined and tested lookup table;
the wireless mobile device usage scenarios and operating modes;
precisely sensing the effect of the wireless mobile device environment based on property, direction, dimension, location, position, range of user and environment with respect to device;
sensing user body, head and hand hold effects;
device orientation;
visual and IR sensing;
change in antenna impedance or impedance mismatch;
lookup table;
actively shared parameters;
SWR or return loss;
power loss due to PLF;
antenna oblique instincts;
gain;
RSSI or ASU;
Direction of Arrival (DOA);
channel capacity;
antenna sensitivity;
signal strength to signal quality ratio;
SNIR;
TIS;
transmit power level;
TRP;
diffraction limits in an active, adoptive and closed loop manner.

9. The antenna system of claim 1, acting as sensors in sensing the change in the wireless mobile device environment based on change in antenna impedance mismatch, gain, SWR or return loss across the one or multiple arrays antennas which are utilized for sensing the effect of environment and its direction with respect to device antenna thereby to accordingly shape and optimize the radiation pattern.

10. The wireless mobile device of claim 1, utilize optical or visual and infrared cameras or sensors to extend the range in sensing the user presence with direction, range, dimension and accordingly shape the radiation pattern to protect the user as well as to optimize signal quality:
a) the processing unit utilizes one or more visual, thermal or infrared cameras and range sensors that are optimally located in the device that senses the user presence and other environments in all possible directions;
b) the cameras and range sensors scans for the users and environment in all possible directions with sensing dimension, direction and range of user and environment with respect to device;
c) the processing unit utilize fisheye lens for sensing the change in environment and also utilize other appropriate feasible lens cameras for further tracking of user in the environment;
d) the processing unit operates with existing front and rear cameras and other optimally located feasible cameras and sensors to that senses the environment in all possible directions;
e) the processing unit operates irrespective of availability of light and pitch-dark or zero light environment utilising lookup table with human body's band of infrared frequencies or wave lengths for sensing the user with thermal imaging;
f) the processing unit utilize property sensing sensors, MIC, ambient light sensors, face recognition with autofocus, iris recognition, active DSP and DIP to enhance the precision in sensing the users and environment;
g) the processing unit computes the direction, dimension, diffraction limits, range of the user and environment with predetermined and tested correlation table parameters to shape the radiation pattern accordingly thereby to protect the user as well as to sustain signal quality.

11. The processing unit of claim 1, is utilized with application for guiding the user to select the optimum location and position for using the wireless mobile device in user living space thereby to achieve best signal quality and to save battery power:
a) the processing unit utilize sensor system parameters, signal quality parameters, channel capacity, the wireless mobile device usage scenarios and operating modes for the computing and detecting the optimum location;
b) the processing unit alerts the user regarding low signal quality and high Electro Magnetic Interference (EMI).

12. The wireless mobile device of claim 1, comprising smart radiation pattern optimizing system that operates utilising artificial intelligence and neural network for sensing and learning the wireless mobile device usage scenarios to act accordingly.

13. The wireless mobile device of claim 1, where the processing unit operates with an actively tuneable electromagnetic screen for dynamically controlling and optimizing the radiations from antenna in corresponding directions that operates based on sensor system parameters, signal quality, operating modes and the wireless mobile device usage scenarios to protect the user by forming tuneable electromagnetic shadow on user facing direction is either fabricated on Printed Circuit Board (PCB) or incorporated on device casing.

14. The wireless mobile device of claim 1, where in the EPARPOS operates with devices comprising mobile cell phones, cordless phones, walky talkie, laptops, satellite phones, gaming devices, (Internet Protocol) IP phones with form factor of the device selected from group consisting of bar, slate, flip, slider, swivel, flexible, watch, transparent, tablet and mixed type.

15. The wireless mobile device of claim 1, where the EPARPOS operates with devices that are with or without, one or multi SIM provision and virtual SIM.

16. The wireless mobile device of claim 1, operates with wireless technologies comprising mobile communication, Bluetooth, Wi-Fi, Wi-Max, ZigBee communication systems with modes of the device in master or slave architecture, infrastructure, peer to peer or one to one, ad-hoc, wireless mesh network; the EPARPOS operates with communication systems ranging from short to intermediate to long range.

* * * * *